United States Patent Office 3,150,206
Patented Sept. 22, 1964

3,150,206
ISOMERIZATION PROCESS AND CATALYST
Elmer L. Miller, Cary, and Theodore R. Embach and Hillis O. Folkins, Crystal Lake, Ill., assignors to The Pure Oil Company, Chicago, Ill., a corporation of Ohio
No Drawing. Filed Oct. 28, 1960, Ser. No. 65,606
10 Claims. (Cl. 260—683.75)

This invention relates to a new and improved process for the isomerization of n-butane, and further to the preparation of novel nickel-containing catalysts used in the isomerization process.

Isomerization has recently come into prominence as a unit process in the petroleum industry for increasing the octane number of low-molecular-weight, saturated, liquid aliphatic hydrocarbons. In particular, the isomerization of the n-butane has been investigated due to the extensive use of isobutane as an alkylation feed. The isomerization of n-pentane and n-hexane has also been extensively investigated due to the fact that isopentanes and isohexanes have substantially higher octane numbers than the corresponding normal paraffins. There have been developed several high-temperature processes for the isomerization of n-pentane and n-hexane utilizing catalysts which consist of a small amount of hydrogenation component supported on a hydrocarbon cracking catalyst. Several processes are known which use catalysts consisting of a platinum-group metal on activated alumina. These processes are variations of the well known reforming processes and operate at temperatures not far below those of reforming processes, viz., 850°–950° F. Another process which has been developed for the isomerization of low-molecular-weight aliphatic hydrocarbons utilizes a catalyst consisting of palladium supported on an acidic hydrocarbon cracking catalyst, e.g., silica-alumina, either alone or with combined fluorine. This process operates at a somewhat lower temperature, viz., 650°–775° F., than the aforementioned isomerization processes. Still another process which has been developed for the isomerization of pentanes, hexanes, and heptanes, utilizes a catalyst consisting of nickel, or nickel compounds, such as reduced nickel molybdate, nickel tungstate, etc., supported on an acidic hydrocarbon cracking catalyst, such as silica-alumina. This process operates in the temperature range from about 600°–700° F., and is operative to the extent that fair yields of isoparaffins can be obtained at relatively low space velocities. However, it has been found that nickel-containing silica-alumina catalysts are generally less active than palladium- or platinum-containing catalysts and produce excessive hydrocracking when used at a high enough temperature to obtain reasonably high yields of isoparaffins. In the development of the various high-temperature, isomerization processes, it has been found that n-butane is the most difficult of the low-molecular-weight paraffins to isomerize. As a result, studies of isomerization of low-molecular-weight aliphatic hydrocarbons have continued in an effort to develop a process which can be efficiently operated at lower temperatures and which is applicable to butane, as well as pentane and hexane.

During and immediately after World War II, there were developed several processes for isomerization of n-butane which were applicable to a limited extent to n-pentane and n-hexane. These processes utilized a Friedel-Crafts catalyst, aluminum chloride, activated with gaseous hydrogen chloride, and operated at a temperature in the range from about 200° to 500° F. These processes were used during the war for the production of isobutane for use as a feed in various alkylation processes and also for the isomerization of n-pentane and n-hexane to produce high-octane-number blending stocks. The low-temperature, aluminum-chloride-catalyzed isomerization processes, however have not had wide commercial acceptance in the petroleum industry due to the problems of corrosivity of the catalyst and hydrogen chloride activator, and due to the problem of recovering and regenerating the contaminated catalysts. In British Patent 555,861, there is described a process for isomerization of olefins, or mixtures of olefins and paraffins, using a combination hydrogen and Friedel-Crafts-type isomerization catalyst. In the British patent, a catalyst is described which consists of nickel on activated charcoal in admixture with about 10% wt. of aluminum chloride. This catalyst is stated to be effective in hydrogenating the olefins and isomerizing the product. Recently, a process has been developed by Bloch and Haensel, Patent No. 2,900,425, which has attempted to combine the catalyst used in the high-temperature and low-temperature isomerization processes. Bloch and Haensel have produced a catalyst consisting of a platinum-group metal on activated alumina containing aluminum chloride in a chemically bound form, e.g., chemically combined with the catalyst support through the surface hydroxyl groups in the support. The catalyst of Bloch and Haensel is reported to be effective in the isomerization of n-butane at temperatures above about 350° F.

It is therefore an object of this invention to provide an improved isomerization process utilizing a novel nickel-containing catalyst and operating at temperatures lower than 500° F.

Another object of this invention is to provide a new and improved and highly active nickel-containing isomerization catalyst.

Another object of this invention is to provide an improved process for the preparation of a highly active nickel-containing isomerization catalyst.

A feature of this invention is the provision of an improved isomerization process in which n-butane is isomerized by contact with a nickel-alumina-aluminum chloride composite catalyst.

Another feature of this invention is the provision of an improved isomerization catalyst consisting of a small amount of nickel on eta- or gamma-alumina and containing chemisorbed and chemically combined aluminum chloride.

Another feature of this invention is the provision of an improved process for the preparation of a highly active isomerization catalyst in which a small amount of nickel is deposited on a support consisting of eta- or gamma-alumina, reduced with hydrogen at an elevated temperature, heated with aluminum chloride at a temperature sufficient to effect reaction with the surface hydroxyl groups in the alumina and purged in a stream of an inert gas to remove aluminum chloride in excess of that reacted or chemisorbed and absorbed hydrogen chloride.

Other objects and features of this invention will become apparent from time to time throughout the specification and claims as hereinafter related.

In this invention, nickel is deposited on eta- or gamma-alumina in the form of a water-soluble salt, e.g., nickel nitrate hexahydrate, $Ni(NO_3)_2 \cdot 6H_2O$, and reduced to metallic form by treatment with hydrogen at an elevated temperature. The reduced catalyst is then treated with anhydrous aluminum chloride at a temperature sufficient to effect reaction between aluminum chloride and the surface hydroxyl groups in the alumina support. The reaction may be carried out at temperatures as low as 200°–300° F., although it may be more desirable to carry the reaction out under a slight superatmospheric pressure at a temperature above the sublimation temperature (352° F.) of aluminum chloride, e.g., 500° F. After treatment with aluminum chloride, the catalyst is then purged in a stream of nitrogen or other inert gas at an elevated temperature, e.g., 400° F., to remove aluminum chloride in excess of that reacted or chemisorbed and adsorbed hydrogen chloride, and to stabilize and enhance catalytic activity.

The catalyst which is produced as described above is unusually effective in the isomerization of n-butane at temperatures in the range from about 200° to 600° F. In isomerizing n-butane, the hydrocarbon is passed, with or without hydrogen or other inert gas diluent, over a catalyst at a temperature sufficient to produce a satisfactory yield of isobutane without excessive loss of hydrocarbon due to cracking, hydrocracking, or dehydrogenation. The isomerizing reaction is effective at temperatures as low as 200°–300° F., although temperatures in the range of 300°–400° F. are preferred, and temperatures as high as 600° F. may be used. The reaction may be carried out at atmospheric pressure, in the absence of hydrogen or other gaseous diluent, or may be carried out using hydrogen or other diluents, and at pressures ranging up to 100 p.s.i.g., or higher. While the subject invention contemplates the use of catalysts which are supported on gamma- or eta-alumina, the catalysts which are supported on eta-alumina are preferred, inasmuch as these catalysts appear to be much more active and more resistant to aging on extended use.

The following non-limiting examples are illustrative of the scope of the subject invention.

EXAMPLE I

A 300 g. sample of eta-alumina, obtained by calcining beta-alumina trihydrate at 1000° F., was impregnated with an aqueous solution of nickel nitrate, $Ni(NO_3)_2 \cdot 6H_2O$, to a nickel content of 1%, dried, pelleted, and reduced in hydrogen for 2 hours at 975° F. A 45.0 gram portion of the reduced catalyst was transferred to a glass-lined rocking autoclave and 24.9 g. of anhydrous aluminum chloride were added, the reactants being maintained under an inert atmosphere of nitrogen at all times. The autoclave was pressured with hydrogen to 25 p.s.i.g. and heated, with agitation, at 500° F. for 7 hours. At the end of the reaction period, the autoclave was cooled to room temperature, and the pressure, due to the formation of hydrogen chloride from the reaction of the surface hydroxyl groups of the alumina support with the anhydrous alumina chloride, was released. The catalyst was transferred from the autoclave to a reactor, where it was heated in a stream of nitrogen at 400° F. to remove aluminum chloride in excess of that reacted or chemisorbed and adsorbed hydrogen chloride, and to stabilize and enhance catalytic activity.

This catalyst was tested for the isomerization of n-butane at 450° F., 300 p.s.i.g., 1.0 liquid volume hourly space velocity, and in admixture with hydrogen at a hydrogen/butane mol ratio of 0.5. In this experiment, isobutane was obtained in a yield per pass of 50% wt., based on n-butane charged, and a selectivity of 94%, based on n-butane consumed in the reaction.

EXAMPLE II

In a series of experiments, several nickel-containing catalysts were prepared, as in the previous example, except for variation in the nickel and aluminum chloride content of the respective catalysts and in three cases, gamma-alumina being substituted for eta-alumina. These catalysts were used in the isomerization of n-butane under two different sets of reaction conditions. In one series of experiments, the various catalysts were evaluated in isomerizing n-butane in the absence of hydrogen diluent at 300° F., atmospheric pressure, and a liquid volume hourly space velocity of 0.25 (liquid space velocity being calculated as the amount of butane in liquid form corresponding to the gaseous butane passing through the reactor). In the second set of experiments, n-butane was isomerized over the various catalysts at 400° F., 300 p.s.i.g., and liquid volume hourly space velocity of 1.0, and in admixture with hydrogen in a hydrogen/butane mol ratio of 0.5. The results of these experiments are set forth in Table I.

*Table I*

| Catalyst | | | | | Condition A[3] | | Condition B[4] | | Aging rate[5] |
| --- | --- | --- | --- | --- | --- | --- | --- | --- | --- |
| No. | Percent Metal[1] | Percent Other[1] | Percent $AlCl_3$[1] | Support | Percent Yield | Percent selectivity | Percent Yield | Percent selectivity | |
| A | 0.5 Ni | None | 17 | Gamma $Al_2O_3$ | 46 | 96 | 37 | 96 | 4.9 |
| B | 1.5 Ni | None | 18 | Gamma $Al_2O_3$ | 34 | 95 | 39 | 98 | 4.3 |
| C | 1.0 Ni | None | 15 | Eta $Al_2O_3$ | 50 | 94 | 45 | 99 | 0 |
| D | 1.0 Ni | None | 15 | Eta $Al_2O_3$ | | | 42 | 98 | |
| E | 1.5 Ni | None | 14 | Eta $Al_2O_3$ | 39 | 92 | 35 | 96 | [6] −3.9 |
| F | 1.0 Ni | None | 10 | Gamma $Al_2O_3$[2] | 2 | 97 | 6 | 95 | |

[1] Weight percent.
[2] Commercial pellets.
[3] 300° F., atmos. pressure, 0.25 LVHSV, 0.0 ratio $H_2/nC_4$.
[4] 400° F., 300 p.s.i.g., 1.0 LVHSV, 0.5 ratio $H_2/nC_4$.
[5] Percent yield units decline per hour at Condition A.
[6] Indicates induction period; full activity not attained.

From these experiments, it is seen that the combination of nickel and combined aluminum chloride on eta-alumina results in a catalyst having an isomerization activity which is much superior to the catalysts of the prior art. The catalyst is generally effective at nickel contents varying from about 0.5 to 5.0% wt., although the optimum nickel content appears to be about 1% wt. The catalysts are effective at combined aluminum chloride contents in the range from 10–20% wt., although an aluminum chloride content of about 13–18% wt. is preferred. The catalysts having eta-alumina as the support have substantially higher initial activity and are less susceptible to aging on extended use than catalysts having gamma-alumina supports, although both types of catalysts are superior to noble metal-containing catalysts or catalysts based on other refractory supports, such as silica gel, charcoal, etc.

EXAMPLE III

In another series of experiments, catalysts are prepared consisting of platinum and combined aluminum chloride on gamma- or eta-alumina for comparison with the catalysts of this invention. Catalyst G was prepared by impregnation of eta-alumina with 0.6% wt. platinum in the form of aqueous solution of platinum chloride containing sufficient hydrofluoric acid to produce a combined fluorine content of 0.3% wt. This catalyst was reduced in hydrogen for 2 hours at 985° F. and impregnated with 17% wt. combined aluminum chloride as in the previous examples. Catalyst H was prepared in the same manner using gamma-alumina as the support and having a platinum content of 0.4% wt., and a fluorine content of 0.3% wt., and a combined aluminum chloride content of 19% wt. Catalyst G was evaluated in the isomerization of n-butane at 300° F., atmospheric pressure, and a liquid volume hourly space velocity of 0.25 in the absence of hydrogen or other diluent. Under these conditions, isobutane was obtained in a yield of 46% and selectivity of only 78% (there was a 22% loss of hydrocarbon in the form of gaseous by-products). Furthermore, after three-hours' operation, the yield per pass of isobutane had dropped to a value less than 30%, thus indicating a very high aging rate for this catalyst. Catalyst G was also evaluated in the isomerization of n-butane in admixture with hydrogen at a hydrogen/butane mol ratio of 0.5, a pressure of 300 p.s.i.g., LVHSV of 1.0, and isomerization reaction temperature of 400° F. Under these reaction conditions, isobutane was obtained in a yield of 35% and selectivity of 90%. Catalyst H was evaluated in the isomerization of n-butane in admixture with hydrogen at a hydrogen/butane mol ratio of 0.5, a pressure of 300 p.s.i.g., liquid volume hourly spaced velocity of 1.0, and isomerization reaction temperature of 400° F. Under these reaction conditions, isobutane was obtained in a yield of 24% wt. and selectivity of 98% wt. The catalyst aging rate was undetermined.

EXAMPLE IV

In another experiment, a catalyst was prepared consisting of palladium and combined aluminum chloride on eta-alumina for comparison with the catalysts of this invention. Catalyst I was prepared by impregnation of eta-alumina with 0.6% wt. palladium in the form of an aqueous solution of palladium chloride. This catalyst was reduced in hydrogen for 2 hours at 975° F. and impregnated with 14% wt. combined aluminum chloride as in the previous examples. Catalyst I was evaluated in the isomerization of n-butane at 300° F., atmospheric pressure, and a liquid volume hourly space velocity of 0.25 in the absence of hydrogen or other diluent. Under these conditions, isobutane was obtained in a yield of 24% and selectivity of 90%. After one-hour's operation, the yield per pass of isobutane had dropped to about 18%, thus indicating a very high aging rate for this catalyst. Catalyst I was also evaluated in the isomerization of n-butane in admixture with hydrogen at a hydrogen/butane mol ratio of 0.5, a pressure of 300 p.s.i.g., LVHSV of 1.0, and isomerization reaction temperature of 400° F. Under these reaction conditions, isobutane was obtained in a yield of 32% and selectivity of 95%.

EXAMPLE V

In another series of experiments, catalysts were prepared consisting of nickel and aluminum chloride on silica gel and charcoal, respectively. Catalyst J was prepared by impregnating 42.9 g. of 4 to 8 mesh (U.S. Standard Sieve Series) silica gel with 0.9% wt. nickel in the form of an aqueous solution of $Ni(NO_3)_2 \cdot 6H_2O$. This catalyst was dried and reduced in hydrogen for 2 hours at 975° F. The catalyst was then treated with aluminum chloride to produce a combined aluminum chloride content of 18% wt. following the procedure of the previous examples. Catalyst J (nickel and aluminum chloride on silica gel) was evaluated in the isomerization of n-butane in the absence of hydrogen diluent at 300° F., atmospheric pressure, and a liquid volume hourly space velocity (liquid space velocity being calculated on the basis of the amount of liquid equivalent to the amount of gas passed through the reactor) of 0.25. Under these reaction conditions, isobutane was obtained in a yield per pass of only 4% wt. and selectively of 81% wt. In another experiment, catalyst J was evaluated in the isomerization of n-butane in admixture with hydrogen in a hydrogen/butane mol ratio of 0.5, a pressure of 3000 p.s.i.g., a liquid volume hourly space velocity of 1.0, and reaction temperature of 400° F. Under these reaction conditions, isobutane was obtained in a yield of only 3% wt. and selectivity of 88%.

Catalyst K was prepared by impregnating 40.8 g. of 8 to 14 mesh (U.S. Standard Sieve Series) activated charcoal with 3.4 g. of $Ni(NO_3)_2 \cdot 6H_2O$. This catalyst was dried and reduced in hydrogen for 2 hours at 975° F. The resulting catalyst was then heated with aluminum chloride as in the previous examples. However, due to the lack of reactive hydroxyl groups in the charcoal, the aluminum chloride did not combine chemically with the support and only 7% wt. aluminum chloride was retained by the support. Catalyst K (nickel and aluminum chloride on charcoal) was evaluated in the isomerization of n-butane in the absence of hydrogen at atmospheric pressure, liquid volume hourly space velocity of 0.25, and reaction temperature of 300° F. Under these reaction conditions, no isobutane was obtained.

We have described our invention with considerable detail and with special emphasis upon the isomerization of n-butane and we wish it to be understood that this process is limited to the isomerization of n-butane using the catalysts and reaction conditions described herein. In our experimental work, to date, we have been unable to adapt this process satisfactorily to the isomerization of other hydrocarbons.

Having thus described our invention with special emphasis upon several preferred embodiments, we wish it to be understood that within the scope of the appended claims, this invention may be practiced otherwise than as specifically described herein.

The embodiments of the invention in which an exclusive property or privilege is claimed are defined as follows:

1. A method of preparing a highly active isomerization catalyst which consists in impregnating eta-alumina with a solution of a reducible nickel compound to a nickel content of 0.5–5.0% wt., reducing the impregnated catalyst with hydrogen at an elevated temperature, heating the reduced catalyst with sufficient anhydrous aluminum chloride, at a temperature sufficient to cause reaction with surface hydroxyl groups in the alumina, to retain 10–20% wt. aluminum chloride in chemically combined and chemisorbed form in the catalyst, and heating the resulting catalyst in a stream of inert gas to remove aluminum chloride in excess of that reacted and chemisorbed and to remove adsorbed by-product hydrogen chloride.

2. A method according to claim 1 in which the catalyst contains 13–18% wt. of aluminum chloride.

3. A method according to claim 1 in which the final heating of the catalyst is carried out at a temperature above the sublimation temperature of aluminum chloride.

4. A method of isomerizing n-butane which consists in contacting n-butane at an isomerization temperature of 200–600° F. with a catalyst prepared in accordance with claim 1.

5. A method in accordance with claim 4 in which the reaction is carried out at atmospheric pressure and 200°–600° F.

6. A method of preparing isobutane which consists in contacting n-butane with a catalyst prepared in accordance with claim 1, containing about 1% of nickel and 13–18% of combined alumina chloride, at atmospheric pressure and a temperature of about 300°–400° F.

7. Method in accordance with claim 2 in which the nickel content is about 1% by weight.

8. Method in accordance with claim 1 in which the nickel content is 1% by weight and the aluminum chloride is present in the amount of 15% by weight.

9. Method in accordance with claim 1 in which the reduced catalyst is heated in contact with the aluminum chloride for a period of 7 hours at 500° F. and the excess aluminum chloride is removed by heating in a stream of nitrogen at 400° F.

10. An isomerization catalyst consisting essentially of eta-alumina impregnated with about 0.5 to 5% by weight of nickel and containing chemisorbed and chemically combined aluminum chloride in an amount equal to about 10 to 20% by weight of the total catalyst.

References Cited in the file of this patent
UNITED STATES PATENTS

| | | |
|---|---|---|
| 2,456,326 | Rupp et al. | Dec. 14, 1948 |
| 2,696,475 | Farrow | Dec. 7, 1954 |
| 2,900,425 | Bloch et al. | Aug. 18, 1959 |
| 2,917,565 | Carr | Dec. 15, 1959 |
| 2,924,628 | Donaldson | Feb. 9, 1960 |
| 2,924,629 | Donaldson | Feb. 9, 1960 |
| 2,927,087 | Smith | Mar. 1, 1960 |